United States Patent [19]

Iwasaki et al.

[11] Patent Number: 4,794,164
[45] Date of Patent: * Dec. 27, 1988

[54] PROCESS FOR PRODUCING A POLYARYLENE SULFIDE OF EXCELLENT HANDLING PROPERTY AND A POLYARYLENE SULFIDE PRODUCED BY THE PROCESS THEREOF

[75] Inventors: Takao Iwasaki; Yo Iizuka; Takayuki Katto; Zenya Shiiki, all of Iwaki, Japan

[73] Assignee: Kureha Kagaku Kogyo Kabushiki Kaisha, Tokyo, Japan

[*] Notice: The portion of the term of this patent subsequent to Feb. 22, 2004 has been disclaimed.

[21] Appl. No.: 84,174

[22] Filed: Aug. 12, 1987

[30] Foreign Application Priority Data

Aug. 13, 1986 [JP] Japan .................. 61-190224

[51] Int. Cl.$^4$ .......................................... C08G 75/14
[52] U.S. Cl. ..................... 528/388; 525/537
[58] Field of Search .................. 528/388; 525/537

[56] References Cited

U.S. PATENT DOCUMENTS 4,415,729 11/1983 Scoggin et al. .............. 528/388
4,645,826 2/1987 Iizuka et al. ................. 525/537

FOREIGN PATENT DOCUMENTS 166368 2/1986 European Pat. Off. .
189895 8/1986 European Pat. Off. .
0226998 12/1986 European Pat. Off. .

Primary Examiner—John C. Bleutge
Assistant Examiner—David W. Woodward
Attorney, Agent, or Firm—Oblon, Fisher, Spivak, McClelland & Maier

[57] ABSTRACT

Disclosed herein are a process for producing a high-molecular-weight or ultra-high-molecular-weight granular PAS of an excellent handling property at an inexpensive cost without using a polymerization aid such as an organic acid salt, and a high-molecular-weight or ultra-high-molecular weight granular PAS of an excellent handling property produced by the process thereof.

12 Claims, 1 Drawing Sheet

PROCESS FOR PRODUCING A POLYARYLENE SULFIDE OF EXCELLENT HANDLING PROPERTY AND A POLYARYLENE SULFIDE PRODUCED BY THE PROCESS THEREOF

BACKGROUND OF THE INVENTION

The present invention relates to a process for producing a polyarylene sulfide (hereinafter simply referred as PAS) and, particularly, the present invention relates to a novel process for producing a high-molecular-weight or ultra-high-molecular-weight granular PAS of an excellent handling property at an inexpensive cost without using a polymerization aid such as an organic acid salt, and a high-molecular-weight or ultra-high-molecular-weight granular PAS of an excellent handling property produced by the process thereof. More in detail, the present invention relates to a process for producing a high-molecular-weight or ultra-high-molecular-weight granular PAS of an excellent handling property, which the process comprises:

(1) a preliminary polymerization step of subjecting an alkali metal sulfide and a dihalo aromatic compound to dehalogenation and sulfidation in such a system that the amount of an aprotic organic polar solvent used is from 0.2 to 5 kg per one mol of the alkali metal sulfide charged and from 0.5 to 5 mol of water is present together per 1 kg of the organic polar solvent, until the conversion of the charged dihalo aromatic compound reaches from 50 to 98 mol % and the melt viscosity of the resultant PAS prepolymer reaches 5 to 300 poise (as measured at 310° C. under a shear rate of 200 sec$^{-1}$), and (2) a two-phase separated polymerization step of adding water to the resultant reaction mixture such that from 5.5 to 15 mol of water is present per 1 kg of the organic polar solvent in the reaction system without separating the resultant prepolymer from the reaction system, (i) heating and maintaining the reaction system at a temperature of about 257° to about 290° C. for at least 10 minutes while stirring, (ii) lowering the temperature of the reaction system and maintaining the reaction system at a temperature of about 220° to about 250° C. for at least 2.0 hours while stirring, and (iii) if necessary, heating and maintaining the reaction system at a temperature of about 250° to about 290° C. for a sufficient time to form a polyarylene sulfide of a desired melt viscosity while stirring, and the present invention also relates to a process for producing a high-molecular-weight or ultra-high-molecular-weight granular PAS of an excellent handling property, which the process comprises:

(1) a preliminary polymerization step of subjecting an alkali metal sulfide and a dihalo aromatic compound to dehalogenation and sulfidation in an aprotic organic polar solvent, thereby forming a PAS prepolymer having a melt viscosity from 5 to 300 poise (as measured at 310° C. under a shear rate of 200 sec$^{-1}$), and (2) a two-phase separated polymerization step of separating the resultant PAS prepolymer, dispersing the thus separated prepolymer in an aprotic organic polar solvent containing from 5.5 to 15 mol of water per 1 kg of the organic polar solvent such that from 0.5 to 3.5 mol of the arylene group in the prepolymer is present per 1 kg of the organic polar solvent, (i) heating the thus obtained dispersion in a strongly alkaline condition (pH of the 10-fold diluted dispersion with water is not less than 9.5) and maintaining the reaction system at a temperature of about 257° to about 290° C. for at least 10 minutes while stirring, (ii) lowering the temperature of the reaction system and maintaining the reaction system at a temperature of about 220° to about 250° C. for at least 2.0 hours while stirring, and (iii) if necessary, heating and maintaining the reaction system at a temperature of about 250° to about 290° C. for a sufficient time to form a polyarylene sulfide of a desired melt viscosity while stirring, and a high-molecular-weight or ultra-high-molecular-weight granular PAS of an excellent handling property produced by the above-mentioned process.

The terms "high-molecular-weight PAS" and "ultra-high-molecular-weight PAS" used in the present invention indicate respectively those PASs having a melt viscosity of from about 1000 to about 7000 poise and more than about 7000 poise (as measured at 310° C. under a shear rate of 200 sec$^{-1}$).

In recent years, thermoplastic resins of higher heat-resistance have been increasingly demanded as a material for the production of electronic equipments and automobile parts.

While PAS has properties capable of satisfying these requirements, it is usually rather difficult to obtain PAS typically represented by polyphenylene sulfide of sufficiently high molecular weight. Therefore, there has been a problem that it is very difficult to obtain fibers or films requiring high strength and molded products requiring high impact strength.

The present invention intends to provide a process for producing a PAS of remarkably high-molecular-weight at an inexpensive cost for solving these problems.

As a typical process for the production of PAS, a process of reacting a dihalo aromatic compound and sodium sulfide in an organic amide solvent such as N-methylpyrrolidone has been disclosed in Japanese Patent Publication No. 45-3368 (U.S. Pat. No. 3,354,129). However, PAS produced by this proposed method is of a low molecular weight and low melt viscosity, and it is difficult to mold it into molded articles, films, sheets, fiber, etc.

In view of the above situation, various methods of improving the process for producing high-molecular-weight PAS have been proposed.

Among the improved methods, a most typical method as described in Japanese Patent Publication No. 52-12240 (U.S. Pat. No. 3,919,177) uses an alkali metal organic acid salt as a polymerization aid in the reaction between a dihalo aromatic compound and sodium sulfide in an organic amide solvent such as N-methyl pyrrolidone. According to this method, the polymerization aid has to be added approximately in an equimolar amount to the alkali metal sulfide and, further, it is required to use a large amount of lithium acetate or sodium benzoate which is expensive in order to obtain particularly a PAS of rather high polymerization degree, and accordingly the production cost of PAS is increased, resulting in an industrial disadvantage.

Further, according to this method, a large amount of organic acid, etc. are liable to contaminate waste water upon recovery of PAS after the polymerization reaction, thereby possibly causing a problem in view of public pollution in this method and there are serious problems from the economical point of view such as requirement of enormous facilities and much running cost for the recovery, reuse and waste of the polymerization aid for prevention of such problems.

As another method of producing PAS of high polymerization degree, there has been proposed a method of using a tri- or higher polyhalo aromatic compound as a crosslinking agent or branching agent during polymerization or at the terminal stage of polymerization [Japanese Patent Application Laid Open (KOKAI) No. 53-136100 (U.S. Pat. No. 4,116,947) etc.].

Although a high-molecular-weight PAS having apparent melt viscosity of several tens of thousands poise can be obtained easily, according to this method of increasing the polymerization degree only by means of the crosslinking agent, this PAS is a highly crosslinked or branched polymer, so that it is poor in the spinnability property and difficult to mold into films or fibers. Further, even if molded articles happen to be obtained, they are mechanically extreme since the molecular chain is basically short.

In view of the foregoing problems, the present inventors have made an intensive study on the polymerization mechanism of the alkali metal sulfide and dihalo aromatic compound in a simple polymerization system in order to find a process for producing a linear PAS having a sufficiently high melt viscosity at a reduced cost without using a polymerization aid such as an alkali metal organic acid salt, and as a result, it has been found that PAS of remarkably high molecular weight can be produced without using any polymerization aid by making a significant difference in various polymerization conditions, particularly, the amount of coexistent water and the polymerization temperature between 1st polymerization step (preliminary polymerization step) and 2nd polymerization step (two-phase separated polymerization step [Japanese Patent Application Laid-Open (KOKAI) No. 61-7332 (U.S. Pat. No. 4,645,826)].

Then, the present inventors have found a process for producing high to ultra-high-molecular-weight PAS by once separating and dispersing the prepolymer in a water-containing polar solvent and then heating the resultant dispersion [Japanese Patent Application Laid-Open (KOKAI) No. 61-66720 (U.S. Pat. No. 4,645,826)].

Any of the methods as described above, developed by the present inventors can be said as a process for producing a high- or ultra-high-molecular-weight PAS by using a watercontaining organic polar solvent as a solvent, thereby causing liquid/liquid two-phase separation (dispersion phase: a liquid phase rich in polymer, and continuous phase: a liquid phase poor in polymer), that is, so to speak "two-phase separated polymerization".

In the two-phase separated polymerization process, it is possible, in a laboratory scale, to prepare an ultra-high-molecular-weight PAS or a PAS by a high polymer-concentration-recipe. However, in the case of industrially producing a PAS in a commercial plant, the dispersion phase reaches a so-called "sticky state" during polymerization, in which the dispersion phase droplets are amalgamated by mutual collision, grown to coarse particles and eventually to lumps. Therefore, the agitation of the stirrers and the discharge of the polymer from the reactors become difficult. Accordingly, there has left a problem, from a technological point of view, for industrially producing an ultra-high-molecular-weight PAS or a PAS by a high polymer-concentration recipe.

Both of the method as described in Japanese Patent Application Laid Open (KOKAI) No. 61-7332 (U.S. Pat. No. 4,645,826) and the method of Japanese Patent Application Laid Open (KOKAI) No. 61-66720 (U.S. Pat. No. 4,645,826) may be called a "two-phase separated polymerization" for producing a high-molecular-weight or ultra-high-molecular-weight linear PAS at an inexpensive cost with no substantial use of the crosslinking agent or polymerization aid (organic acid salt, etc.), and each of them comprises a process of at first preparing a prepolymer of a melt viscosity from 5 to 3000 poise (as measured at 310° C. under a shear rate of 200 $\sec^{-1}$), heating the resultant prepolymer to about 240° to 290° C. in a strongly alkaline water-containing aprotic organic polar solvent containing a sufficient amount of water, and carrying out a liquid-liquid two-phase separated polymerization (dispersion phase: a liquid phase rich in polymer, and continuous phase: a liquid phase poor in polymer), thereby obtaining a polyarylene sulfide of higher molecular weight.

As the two-phase separated polymerization proceeds in this process, the dispersion phase is thought to become more viscous gradually and to reach within the region of the so-called "sticky state" where dispersion phase droplets are liable to be amalgamated and hard to be devided (the region is particularly wide in a high polymer-concentration recipe.)

Then, the dispersion phase droplets are amalgamated by mutual collision, grown to coarse particles and eventually to lumps.

The present inventors have made an intensive study on the method as described above for preventing the dispersion phase from forming the sticky state during polymerization and preventing the dispersion phase droplets from amalgamation or growing. Then it has been found that by conducting the two-phase separated polymerization in the reaction system containing the polyarylene prepolymer and from 5.5 to 15 mol of water per 1 kg of an organic polar solvent by way of the following procedures:

(i) heating and maintaining the reaction system at a temperature of from about 257° to about 290° C. with stirring in order to form a liquid-liquid-two-phase and to proceed polymerization, (ii) lowering the temperature of the reaction system before the dispersion phase becomes viscous and forms a sticky state, and stirring the reaction system at a temperature of from about 220° to about 250° C. for at least 2.0 hours, and (iii) heating the reaction system, if necessary, to a temperature of from about 250° to about 290° C. for a sufficient time to form a polyarylene sulfide of a desired melt viscosity with stirring, while the dispersion phase droplets prevented from amalgamation or growing and an ultra-high-molecular-weight granular PAS or high-molecular-weight granular PAS of an excellent handling property has been obtained, and based on the findings as described above, the present invention has been attained.

SUMMARY OF THE INVENTION

In a first aspect of the present invention, there is provided a process for producing a high-molecular-weight or ultra-high-molecular-weight polyarylene sulfide of an excellent handling property, which the process comprises:

(1) a preliminary polymerization step of subjecting an alkali metal sulfide and a dihalo aromatic compound to dehalogenation and sulfidation in a system where the amount of an aprotic organic polar solvent used is from 0.2 to 5 kg per one mol of the alkali metal sulfide charged and from 0.5 to 5 mol of water is present together per one kg of the organic polar solvent, until the conversion of the dihalo aromatic compound charged reaches from 50 to 98 mol % and the melt viscosity of the resultant prepolymer reaches 5 to 300 poise (as measured at 310° C. under a shear rate of 200 sec$^{-1}$), and (2) a two-phase separated polymerization step of adding water to the resultant reaction mixture such that from 5.5 to 15 mol of water is present per 1 kg of the organic polar solvent in the reaction system without separating the resultant prepolymer from the reaction system, (i) heating and maintaining the reaction system for at least 10 minutes at a temperature ($T_1$) within a range of from 257° to 290° C. while stirring, (ii) lowering the temperature of the reaction system and maintaining the reaction system for at least 2.0 hours at a temperature ($T_2$) within a range of from 220° to 250° C. while stirring, and (iii) if necessary, heating and maintaining the reaction system at a temperature ($T_3$) within a range of from 250° to 290° C. for a sufficient time to form a polyarylene sulfide of a desired melt viscosity while stirring.

In a second aspect of the present invention, there is provided a process for producing a high-molecular-weight or ultra-high-molecular-weight polyarylene sulfide of an excellent handling property, which the process comprises:

(1) a preliminary polymerization step of subjecting an alkali metal sulfide and a dihalo aromatic compound to dehalogenation and sulfidation in an aprotic organic polar solvent, thereby forming a prepolymer of a melt viscosity from 5 to 300 poise (as measured at 310° C. under a shear rate of 200 sec$^{-1}$, and (2) a two-phase separated polymerization step of separating the resultant prepolymer, dispersing the thus separated prepolymer in an aprotic organic polar solvent containing from 5.5 to 15 mol of water per 1 kg of the organic polar solvent such that from 0.5 to 3.5 mol of arylene group therein is present per 1 kg of the organic polar solvent, (i) heating the thus obtained dispersion in a strongly alkaline condition (pH value of the 10-fold diluted dispersion with water is not less than 9.5) and maintaining the reaction system at a temperature ($T_1$) within a range of from 257° to 290° C. for at least 10 minutes while stirring, (ii) lowering the temperature of the reaction system and maintaining the reaction system at a temperature ($T_2$) within a range of from 220° to 250° C. for at least 2.0 hours while stirring, and (iii) if necessary, heating and maintaining the reaction system at a temperature ($T_3$) within a range of from 250° to 290° C. for a sufficient time to form a polyarylene sulfide of a desired melt viscosity while stirring.

In a third aspect of the present invention, there is provided a high-molecular-weight or ultra-high-molecular-weight polyarylene sulfide produced by the process of the first aspect or the second aspect, showing excellent free flowing property and handling property, and having:

an average grain size of from 0.25 to 3 mm, a bulk density of 0.25 to 0.8 g/ml, a sharp grain size distribution with the grain size from 0.25 to 5 mm, and a melt viscosity of not less than 1000 poise (as measured at 310° C. under a shear rate of 200 sec$^{-1}$).

DETAILED DESCRIPTION OF THE INVENTION

Figure 1:
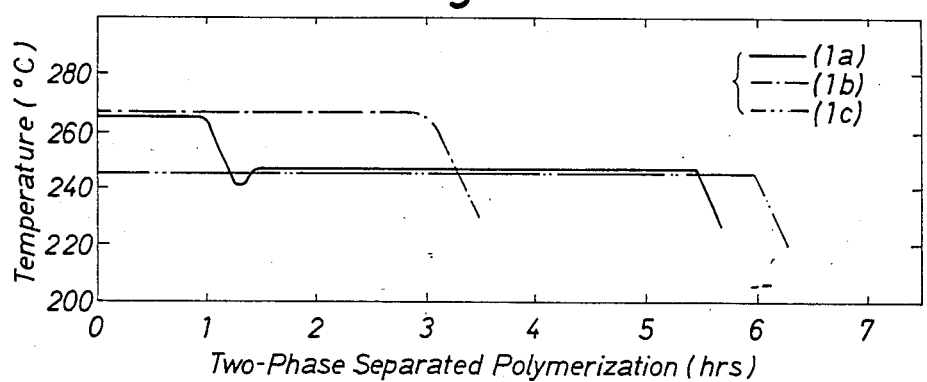
FIGS. 1 to 3 are, respectively, explanatory views illustrating the temperature profiles in the experiments in Examples 1 to 3.

The process for producing a granular PAS of an excellent handling property comprises conducting the reaction between an alkali metal sulfide and a dihalo aromatic compound under specific conditions.

Alkali Metal Sulfide

The alkali metal sulfide to be used in the present invention can include lithium sulfide, sodium sulfide, potassium sulfide, rubidium sulfide, cesium sulfide and mixture thereof. Needless of say, alkali metal sulfide produced in situ are included. These alkali metal sulfides may be used as hydrates, aqueous mixtures or in anhydrous forms.

Among the alkali metal sulfides, sodium sulfide is most inexpensive and industrially preferred.

A small about of alkali metal alkoxides and/or hydroxides may be used together for reacting with alkali metal bisulfides or alkali metal thiosulfates which may possibly be present in a slight amount in the alkali metal sulfide, thereby removing these impurities or converting them into harmless substances.

Dihalo Aromatic Compound

The dihalo aromatic compound to be used in the present invention can include, for example, those dihalo aromatic compounds as described in Japanese Patent Application Laid Open (KOKAI) No. 59-22926 (U.S. Pat. No. 4,495,332). Particularly preferred are p-dichlorobenzene, m-dichlorobenzene, 2,5-dichlorotoluene, p-dibromobenzene, 1,4-dichloro-naphthalene, 1-methoxy-2,5-dichlorobenzene, 4,4'-dichlorobiphenyl, 3,5-dichlorobenzoic acid, 4,4'-dichlorodiphenyl ether, 4,4'-dichlorodiphenyl sulfone, 4,4'-dichlorodiphenyl sulfoxide and 4,4'-dichlorodiphenyl ketone. Among all, those containing para-dihalobenzene, typically p-dichlorobenzene as the main ingredient are particularly preferred.

By appropriate selection and combination of dihalo aromatic compounds, a copolymer containing two or more of different reaction units can be obtained. For instance, a copolymer comprising the repeating unit of:

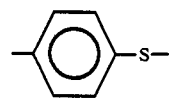

and the repeating unit of:

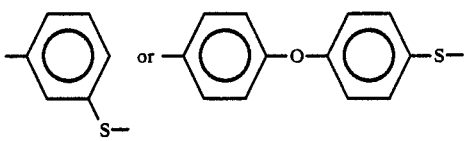

can be obtained by using p-dichlorobenzene in combination with m-dichlorobenzene or 4,4'-dichlorodiphenyl ether.

While the PAS according to the present invention is a polymer of the dihalo aromatic compound as described above, it is also possible to use a monohalo compound (not always necessarily be an aromatic compound) in combination with the dihalo aromatic compound in order to form the terminal end of the resultant polymer, or control the polymerization reaction or molecular weight. In the present invention, tri- or higher polyhalo aromatic compound (not always necessarily be an aromatic compound) may be used together for forming a branched or crosslinked polymer. Concrete example for a case where the monohalo or polyhalo compound is an aromatic compound will be apparent to those skilled in the art as a derivative of the monohalo or polyhalo derivative of the specific examples described above. According to the process of the present invention, a high- or medium-molecular-weight PAS can predominantly be obtained in the case of not using the polyhalo compound. While on the other hand, by using a polyhalo compound, for example, trichlorobenzene in such a small amount as not causing remarkable degradation in the processability in combination with dichlorobenzene, an ultra-high-molecular-weight phenylene sulfide polymer can predominantly be obtained. Specifically, by using dichlorobenzene with a small amount of trichlorobenzene, a high-molecular-weight branched phenylene sulfide polymer can be obtained. In order to form fibers or films, it is preferred that PAS has no or less branching or crosslinking.

Polymerization Solvent

As the aprotic organic polar solvent to be used in the polymerization reaction according to the present invention, organic amides including carbamic acid amide derivatives, such as N-methylpyrrolidone (NMP), N-ethylpyrrolidone, N,N-dimethylformamide, N,N-dimethylacetoamide, N-methylcaprolactam, tetramethyl urea, dimethylimidazoline, hexamethyl phosphoric acid triamide, and mixtures thereof may be exemplified. Among them, N-methylpyrrolidone is particularly preferred.

The amount of the organic polar solvent used in the reaction system is preferably from 0.2 to 5 kg, particularly preferably, from 0.25 to 2 kg per one mol of the charged metal sulfide (substantially identical per one mol of the arylene group in the charged dihalo aromatic compound) in Method I described later, and per one mol of arylene group in the coexistent prepolymer in Method II also described later, respectively. The present invention has a great merit that a granular PAS of an excellent handling property can be produced even by a high polymer-concentration recipe of arylene group in the prepolymer of from 2.3 to 3.5 mol per 1 kg of the organic polar solvent.

Reaction Apparatus

Various steps in the polymerization process according to the present invention, among all, the dehydration step usually conducted for the control of water content before the beginning of the polymerization reaction for forming a prepolymer are preferably conducted by using a reaction apparatus in which at least those parts in contact with the reaction solution are constituted with titanium material, for preventing the decomposition of the solvent and the polymer and protecting products against contaminations with heavy metal salts.

In the present invention, since the agitation is indispensable to the chemical granulation of PAS, a reaction vessel provided with a stirring device is desired.

Production of PAS

The production processes disclosed in Japanese Patent Application Laid Open (KOKAI) No. 61-7332 (U.S. Pat. No. 4,645,826) and Japanese Patent Application Laid Open (KOKAI) No. 61-66720 (U.S. Pat. No. 4,645,826), are typical two types of the two-phase separated polymerization process the inventors or the colleagues developed. The former discloses a process of at first forming a prepolymer, adding a large amount of water to the reaction slurry without separating the prepolymer from the reaction slurry, heating the resultant mixture, thereby causing phase separation at a high temperature and further continuing the polymerization (hereinafter referred to simply as a process A). While on the other hand, the latter discloses a process of at first forming a prepolymer, separating the prepolymer once from the reaction solution, then redispersing the same into a water-containing fresh organic polar solvent, heating the resultant mixture, thereby causing phase separation at a high temperature and further continuing the polymerization (hereinafter simply referred to as a process B).

Preliminary Polymerization Step

(1) Method I

In the method I, a prepolymer is formed in the preliminary polymerization step and then the two-phase separated polymerization step is conducted without separating the prepolymer from the reaction solution.

The preliminary polymerization step of the Method I can be considered to belong to the type of the process A of U.S. Pat. No. 4,645,826 in which the prepolymer is subjected to the succeeding step without separation from the reaction solution, but the polymerization conditions per se for the preliminary polymerization step are not always limited to those described in U.S. Pat. No. 4,645,826 regarding the process A.

Specifically, in the Method I, an alkali metal sulfide and a dihalo aromatic compound are reacted in such a system where the amount of the organic polar solvent used in the reaction system is from 0.2 to 5 kg per one mol of the amount of the alkali metal sulfide charged (substantially identical with the amount per one mol of the dihalo aromatic compound charged) and from 0.5 to 5 mol of water is present per 1 kg of the organic polar solvent, at a temperature of from 180° to 240° C., until the conversion of the dihalo aromatic compound charged reaches 50 to 98 mol % and the melt viscosity of the resultant prepolymer reaches 5 to 300 poise (as measured at 310° C. under a shear rate of 200 sec$^{-1}$) and then the two-phase separated polymerization step is conducted by adding water to the reaction system without separating the resultant prepolymer from the reaction solution.

In this method, a dehydration procedure is usually conducted prior to the polymerization for the formation of prepolymer for adjusting the water content in the reaction system. In this method, since the alkali metal sulfide is partially decomposed to form a strongly alkaline substance, the reaction system shows a sufficiently strong alkali with no adjustment.

In the case of conducting the polymerization according to the present invention, a small amount of alkali such as alkali metal hydroxide or alkaline earth metal hydroxide, various kinds of salts, for example, alkali metal carboxylate, alkaline earth metal carboxylate, alkali metal sulfonate, lithium chloride, lithium carbonate, potassium fluoride, etc. can be added within a range not hindering the advantageous feature of the polymerization process according to the present invention.

The conversion of the dihalo aromatic compound in the present invention is calculated according to the following formulas:

(a) In the case of adding the dihalo aromatic compound (simply referred to as DHA) in a molar ratio in excess of the alkali metal sulfide:

$$\text{Conversion} = \frac{\text{DHA charged (moles)} - \text{Residual DHA (moles)}}{\text{DHA charged (moles)} - \text{Excessive DHA (moles)}} \times 100$$

(b) In other cases than (a) above $$\text{Conversion} = \frac{\text{DHA charged (moles)} - \text{Residual DHA (moles)}}{\text{DHA charged (moles)}} \times 100$$

(2) Method II

In the method II, the two-phase separated polymerization step is conducted after separating the prepolymer obtained by the preliminary polymerization once from the reaction slurry and the preliminary polymerization step may be effected in any manner suitable to the purpose so long as the resultant prepolymer has a melt viscosity from 5 to 300 poise (as measured at 310° C. under a shear rate of 200 sec$^{-1}$). The preliminary polymerization step of the Method II can be said to belong to the process B in which the prepolymer is separated from the reaction slurry and then subjected to the succeeding step, but the polymerization conditions per se for the preliminary polymerization step are not necessarily limited to those described in U.S. Pat. No. 4,645,826 regarding the process B.

One of specific examples of the reaction conditions for the preliminary polymerization step in the Method II is the same for the polymerization condition employed in the preliminary polymerization step in the Method I (specifically, the amount of the arylene group and water per 1 kg of the organic polar solvent, the conversion of the charged dihalo aromatic compound, etc.).

The prepolymer obtained by conducting the preliminary polymerization step can be subjected to the two-phase separated polymerization step in a dry state as well as in a wet state.

Two-Phase Separated Polymerization Step

Irrespective of the fact that the prepolymer is present in the reaction slurry of the preliminary polymerization step, or is separated from the reaction slurry of the preliminary polymerization, the prepolymer obtained in the preliminary polymerization step is dispersed in an aprotic organic polar solvent containing from 5.5 to 15 mol, preferably, from 6.0 to 12.0 mol of water per 1 kg of the organic polar solvent, in such a system that the amount of the organic polar solvent used is from 0.2 to 5 kg, preferably, from 0.25 to 2 kg per one mol of the arylene group in the coexistent prepolymer in the case of Method II or per one mol of the charged metal sulfide (substantially identical with the amount per one mol of the arylene group of the charged dihalo aromatic compound) in the preliminary polymerization step in the case of Method I. A granular PAS of an excellent handling property can be produced even by a high polymer-concentration recipe of arylene group in the prepolymer of from 2.3 to 3.5 mol per 1 kg of the organic polar solvents. Then the reaction system is maintained at first at a temperature ($T_1$) within a range of from about 257° to about 290° C., preferably, from about 260° to about 280° C. for at least 10 min, preferably, from 20 min to 20 hrs, while stirring. The temperature ($T_1$) may not necessarily be constant within the above-mentioned range.

Then, the temperature of the reaction system is lowered rapidly before the dispersion phase comes into a "sticky state" and the reaction system is kept at a temperature ($T_2$) within a range of from about 220° to about 250° C., preferably, from about 230° to about 245° C. for at least 2.0 hrs, preferably, from 3.0 hrs to 50 hrs. The temperature ($T_2$) may not necessarily be constant so long as it is within the above-mentioned range.

In the two-phase separated polymerization step according to the present invention, it is essential to keep the conditions of ($T_1$), ($T_2$) and the polymerization duration at the temperature. After the polymerization at a temperature of $T_2$ has been carried out for at least 2.0 hours, the polymerization can be continued at a temperature within the range of ($T_2$) until a PAS having a desired melt viscosity is obtained, or the polymerization can be continued by elevating the temperature of the reaction system again to a temperature ($T_3$) within a range of from about 250° to about 290° C., preferably, from about 260° to about 280° C., if it is required to shorten the subsequent polymerization time.

The initial temperature ($T_1$) in the two-phase separated polymerization step is within a range as high as from about 257° to about 290° C., preferably, from about 260° C. to about 280° C., so that the prepolymer may be surely dissolved, thereby attain the formation of the liquid-liquid two-phase separated situation. If the temperature is lower than 257° C., dissolution of the prepolymer may be insufficient. While on the other hand, if it is higher than 290° C., the solvent or the polymer may be decomposed. Further, if the time for maintaining the reaction system at temperature ($T_1$) is less than 10 min., the liquid-liquid two-phase separation may become insufficient, since the dissolution of the prepolymer is insufficient.

Then, the temperature of the reaction system is rapidly lowered and instantly maintained within a range of from about 220° to about 250° C., preferably, from about 230° to about 245° C. ($T_2$), so that the temperature of the dispersion phase is lowered in order to release a certain portion of monomers and oligomers contained in the dispersion phase which are thought to cause amalgamation mainly, to the continuous phase, by a kind of fractionation effect, thereby preventing the amalgamation and growth when the particles in the dispersion phase collides with each other. If the temperature is higher than about 250° C., prevention for the amalgamation and growth of the particles in the dispersion phase is insufficient and, while on the other hand, if it is lower than about 220° C., the polymerization reaction rate in the dispersion phase is remarkably reduced undesirably.

Upon rapid lowering of the temperature of the reaction system ($T_1$ to $T_2$), prevention of the amalgamation and growth in the dispersion phase of the two-phase separated polymerization step can be attained more surely by once lowering the temperature of the reaction system to a temperature lower than the predetermined temperature ($T_2$), particularly, below 230° C. and then elevating again to a predetermined temperature ($T_2$). This may be attributable to the reason that if the temperature of the dispersion phase is lowered to the temperature ($T_2$), the release of the monomers and oligomers remains insufficient for a while and the amalgamation and growth of the particles may be caused, but if the temperature is lowered to less than $T_2$, the release is attained more surely.

The temperature difference $\Delta T(=T_1-T_2)$ between $T_1$ and $T_2$ is preferably from not less than 8° C., more preferably, from 9° to 70° C., because this can surely prevent the amalgamation and growth of the particles in the dispersion phase of the two-phase separated polymerization step. As has been described above, the polymerization reaction can be continued at the temperature ($T_2$) until a polymer having a desired melt viscosity is formed. However, if shortening the polymerization time required, after the polymerization at the temperature ($T_2$) for at least 2.0 hours, the polymerization reaction may be continued until a PAS having a desired melt viscosity is formed, by maintaining the temperature of the reaction system at ($T_3$) within a range of from about 250° to about 290° C., preferably, from about 260° C. to about 280° C. Whether or not temperature elevation up to ($T_3$) after polymerized at ($T_2$) is conducted, the polymerization ($T_2$) has to be carried out for at least 2.0 hrs, preferably, from 3.0 hrs to 50 hrs continuously. If the polymerization reaction at temperature ($T_2$) is conducted for less than 2.0 hrs, the dispersion phase droplets may be amalgamated and growth to coarse particles or lumps, owing to the insufficient releasing of monomers and oligomers from the dispersion phase. Temperature ($T_3$) of higher than 290° C. is not preferable since the solvent or the polymer may be decomposed.

The two-phase separated polymerization is conducted under a strongly alkaline condition, that is, under such a condition that pH of the 10-fold diluted reaction slurry with water is not less than 9.5, preferably 9.5 to 14.

In the case of Method I, if the alkalinity of the reaction system is insufficient in the two-phase separated polymerization step, it is necessary to add an appropriate alkali agent, particularly, those soluble to the reaction solution, for example, alkoxide (including phenoxide), oxide, hydroxide, carbonate, borate, etc. of alkali metal or alkaline earth metal.

Needless to say, in the case of Method II, it is required to attain alkaline condition in the two-phase separated polymerization step.

Recovery Process

Since the PAS obtained by the process according to the present invention is excellent in the handling property, it has a great merit that the post treatment can be applied with extreme ease.

That is, the reaction slurry can be easily discharged from a reaction vessel after the completion of the polymerization reaction, and no substantial troubles occur due to the polymer remaining in the reaction vessel. Then, by using an ordinary screen (openings: about 0.1 mm), only the polymer particles can usually be sieved from the discharged reaction slurry. The sieved polymer is washed with water, with solvent (acetone, etc) and, if necessary, with an acid solution, followed by drying to recover powdery PAS of excellent free flowing property.

Properties and Uses of the Produced PAS

PAS produced by the process according to the present invention is a granular polymer having a melt viscosity of not less than 1000 poise, preferably, 2000 poise (as measured at 310° C. under a shear rate of 200 $sec^{-1}$), an average grain size from 0.25 to 3 mm, and a bulk density of not less than 0.25 (g/ml), and showing an excellent free flowing property. However, since a polymer granules with an excessively high bulk density have usually excessively compact structure and are difficult to be washed inside the granules in the recovery process, the polymer granules with a bulk density of not more than 0.8 (g/ml) are preferred. Since the PAS produced by the process according to the present invention is excellent in the free flowing property, it can be easily handled for powder transportation, packing, storage, etc., it is also excellent in the fitness to the melt processing machine because it is freely fallen in a hopper during melt processing.

Further, since the PAS produced by the process according to the present invention is a high-molecular-weight or ultra-high-molecular-weight polymer, it is possible to obtain films or fibers of an extremely high elongation from the PAS according to the present invention. In addition, it is also possible to obtain molding products with extremely high impact strength or high flexural strength at a reduced cost.

PAS produced by the process according to the present invention can be used as a composition mixed with at least one of synthetic resins such as polyphenylene sulfide copolymer, poly-m-phenylene sulfide, poly-p-phenylene sulfide of different polymerization degree, polyether ether ketone, polyether sulfone, polysulfone, polyimide, polyamide, polyphenylene ether, polyarylene, polycarbonate, polyacetal, crystalline or amorphous polyester, fluoroplastics, polystyrene, polyolefin and ABS, or elastomers such as olefin rubber, fluoro rubber, silicone rubber, butyl rubber, hydrogenated SBR rubber, butyl rubber, polyester rubber and polyamide rubber.

Furthermore, the PAS produced by the process according to the present invention can also be used as a composition mixed with at least one of fiberous fillers such as carbon fibers, glass fibers, calcium silicate fibers, potassium titanate fibers, silica fibers, calcium sulfate fibers and asbestos, or powdery fillers such as mica, silica powder, alumina powder, titanium oxide powder, calcium carbonate powder, talc, clay, glass powder, calcium silicate powder and calcium sulfate powder.

According to the present invention it is possible to industrially produce an ultra-high-molecular-weight PAS or high-molecular-weight PAS (high polymer concentration recipe) of an excellent handling property in a commercial plant. The term "PAS of an excellent handling property" in the present invention means those PASs which are easy for the transportation, solid-liquid separation, etc. in the form of a slurry discharged from a polymerization vessel or granular PASs of an excellent free flowing property in a dry state. The excellent handling property is due to the property of particles of the PAS obtained by the present invention. That is, the PAS particles of the present invention have in the preferred embodiment thereof a sharp grain size distribution ranging of from about 0.25 to about 5 mm and a bulk density of about 0.25 to about 0.8 (g/ml) and such a preferable handling property can be obtained due to the property of the particles per se.

According to the process of the present invention, a high polymer-concentration recipe of a high-molecular-weight PAS is possible and the productivity can also be improved substantially.

The present invention is explained in more detail in the following examples, however, it should be recognized that the scope of the present invention is not restricted to these examples.

EXAMPLE 1

Experiment (1a)

Into a 200 liter autoclave lined with Ti and provided with a stirring device having a paddle-type agitation-blade [plunger valve for discharge (clearance: 10 mm) was disposed at the bottom], 119 kg of N-methylpyrrolidone (hereinafter simply referred to as NMP) and 250 mol of hydrous $Na_2S$ (solid content: 45.98%) were charged and the temperature was elevated to about 203° C. under an $N_2$ gas stream while stirring at 140 rpm to distill out 880 mol of water and 19.5 kg of NMP. Then, 247 mol of p-dichlorobenzene (hereinafter simply referred to as p-DCB) and 3 mol of m-dichlorobenzene (hereinafter simply referred to as m-DCB) [(arylene group/NMP)=2.5 (mol/kg), (total water content/NMP)=4.0 (mol/kg)] were added and polymerized at 220° C. for 5 hrs to produce a prepolymer (melt viscosity: 50 poise, p-DCB conversion: 93 mol %). 606 mol of water was further added to the reaction solution containing the prepolymer [(total water content/NMP)=10.0 (mol/kg), (total arylene group/NMP=2.5 (mol/kg)]. Then, the two-phase separated polymerization step was initiated while stirring at 140 rpm.

That is, the reaction system was maintained at a temperature ($T_1$=265° C.) for 1.0 hr and then was cooled rapidly (down to a temperature of about 240° C.), and the temperature of the reaction system was instantly adjusted to a temperature ($T_2$=245° C.) ($\Delta T = T_1 - T_2 = 20°$ C.) and the reaction system was maintained for 4.0 hrs at the same temperature.

Soon after the reaction was over, the bottom plunger valve was opened to discharge the entire reaction solution slurry to a receiver. No substantial polymer was remained in the autoclave. pH of the 10-fold diluted reaction slurry with water was 10.5. The reaction slurry was drawn from the receiver and separated into polymer (granular) and other ingredients (salt-containing solvent) by using a screen (openings: 0.1 mm).

The polymer was recovered after applying acetone washing/water washing for three times repeatedly and drying. The resultant polymer was a granular high-molecular-weight PAS of a good handling property with an average grain size of 0.7 mm and a bulk density of 0.41 (g/ml) and having a melt viscosity $\eta^* = 3800$ poise (solution viscosity $\eta_{inh}=0.35$).

The melt viscosity $\eta^*$ in the example according to present invention is determined by subjecting the sampled reaction slurry to suction filtration, washing the solid content with water/acetone, filtering and drying at a reduced pressure at 100° C., molding the thus obtained powdery sample in a hot press at 320° C. for 30 sec. into a sheet-like sample of about 0.2 mm in thickness, measuring a viscosity of the sample at 310° C. by using a KOKA-type flow tester and determining a value corresponding to a shear rate of 200 sec$^{-1}$. The solution viscosity $\eta_{inh}$ was determined for the powdery sample obtained in the same way by dissolving the sample into 1-chloro-naphthalene at a concentration of 0.4 g/dl and measuring the viscosity at a temperature of 206° C.

EXPERIMENT (1b) (COMPARATIVE EXPERIMENT)

In the two-phase separated polymerization step in Experiment (1a), polymerization was conducted at a temperature ($T_1$=265° C.) and the polymerization reaction was continued for 3.0 hrs. without lowering the temperature in the course of the polymerization reaction. After the polymerization reaction was over, the plunger valve at the bottom of the autoclave was opened to discharge the reaction slurry. However, the coarse particles polymer clogs the valve clearance, by which about 15% of the polymer could not be discharged. The reaction slurry that can be discharged was applied with recovery process in the same manner as in Experiment (1a) and the polymer was recovered. The thus obtained polymer was coarse particles of poor handling property with the average grain size of 6 mm. The melt viscosity of the polymer was 3600 poise ($\eta_{inh}=0.34$).

EXPERIMENT (1c) (COMPARATIVE EXAMPLE)

In the two-phase separated polymerization step in Experiment (1), polymerization was conducted at temperature ($T_1$=245° C.) and the polymerization reaction was continued for 6.0 hrs without varying the temperature in the course of the polymerization reaction. After the polymerization reaction was over, the plunger valve at the bottom of the autoclave was opened to discharge the reaction slurry. There was no substantial slurry remained in the autoclave. However, the polymer was finely powdery, the slurry was viscous-like milk and the polymer could not be separated through a screen (openings: 0.1 mm). In view of the above, the slurry was poured into a large amount of water and diluted, stood still over one day and one night to settle the polymer, was separated by using centrifugal separator, washed with acetone/water repeatedly for three times and dried to obtain a polymer. The thus obtained polymer was fine powder of an extremely poor handling property with an average grain size of less than 0.1 mm, a bulk density of 0.21 (g/ml) and a melt viscosity of 470 poise ($\eta_{inh}=0.23$). Temperature profiles in Experiments (1a–1c) in Example 1 are as shown in FIG. 1.

EXAMPLE 2

Experiment (2a)

To a 200 liter autoclave lined with Ti and provided with a stirrer having a paddle-type agitation-blade [plunger valve for discharge (clearance: 10 mm) was disposed at the bottom], 145 kg of NMP and 250 mol of hydrous Na$_2$S (solid content: 45.98%) were charged, and the temperature was elevated to about 204° C. under an N$_2$ gas stream while stirring at 110 rpm to distill out 909 mol water and 20 kg of NMP. 248 mol of p-DCB [(arylene group/NMP)=2.0 (mol/kg), (total water content/NMP)=2.9 (mol/kg)] was added and polymerized at 220° C. for 5 hrs to produce a prepolymer (melt viscosity: 60 poise, p-DCB conversion: 94 mol %).

503 mol of water and 0.70 mol of 1,3,5-trichlorobenzene were added to the reaction solution containing the prepolymer [(total water content/NMP)=6.9 (mol/kg), (total arylene group/NMP)=2.0 (mol/kg)]. Then, the two-phase separated polymerization step was initiated while stirring at 110 rpm. That is, the reaction system was maintained at a temperature (T$_1$=260° C.) for 30 minutes, then, cooled rapidly, instantly adjusted to a temperature (T$_2$=249° C.) ($\Delta T = _1 - T_2 = 11°$ C.) and maintained for 5.0 hrs.

After the reaction was over, the bottom plunger valve was opened instantly to discharge all of the entire reaction solution slurry to a receiver. No substantial polymer was remained in the autoclave. The pH of the 10-fold diluted reaction slurry with water was 10.3. The reaction slurry was drawn from the receiver and separated into polymer (granular) and other ingredients (salt-containing solvent) by using a screen (openings: 0.1 mm). The polymer was washed repeatedly with acetone/water for three times, dried and recovered. The resultant polymer was granular ultra-high-molecular-weight PAS of excellent handling property with an average grain size of 1.0 mm, a bulk density of 0.38 (g/ml), and a melt viscosity of 32000 poise (solution viscosity $\eta_{inh}$=0.72).

EXPERIMENT (2b) (COMPARATIVE EXPERIMENT)

In the two-phase separated polymerization step in Experiment (2a), the polymerization reaction was continued while setting the temperature (T$_2$) to 254° C. ($\Delta T$=6° C.). When about three hours was elapsed after the initiation of the polymerization at the temperature (T$_2$=254° C.), stirring could no more be continued due to the overload. Then, the reaction was interrupted and the bottom plunger valve was opened, but most of the polymer could not be discharged. After cooling, the top cover of the autoclave was opened to find that the polymer formed coarser particles or became lumpy and a portion thereof was wound around the agitation blade. The melt viscosity of the polymer was 11,000 poise (solution viscosity $\eta_{inh}$=0.52).

EXPERIMENT (2c) (COMPARATIVE EXPERIMENT)

Polymerization was conducted for 8.0 hrs while maintaining the temperature of the reaction system at T$_2$=215° C. ($\Delta T$=45° C.) in Experiment (2a). After the polymerization was completed, the reaction slurry was discharged. The slurry was milky similar to that in Experiment (1c). After treatment was applied in the same manner as in Experiment (1c) to recover the polymer.

Figure 2:
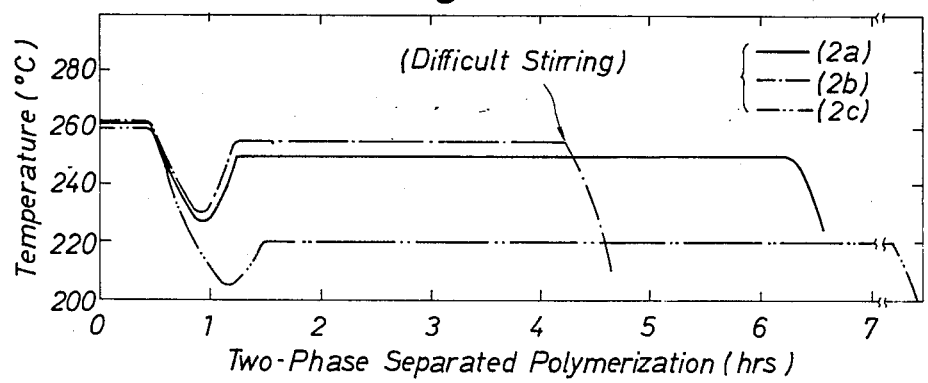

The resultant polymer was a fine powder of an extremely poor handling property with an average grain size of less than 0.1 mm, a bulk density of 0.22 (g/ml) and melt viscosity of 810 poise [$\eta_{inh}$=0.27 (g/ml)]. The temperature profiles in Experiments (2a)–(2c) in Example 2 are collectively shown in FIG. 2.

EXAMPLE 3

Experiment (3a)

In the two-phase separated polymerization step in Experiment (2a) of Example 2, after maintaining the reaction system at a temperature (T$_2$=249° C.) for 3 hrs, the temperature was elevated and polymerization was continued at a temperature (T$_3$=260° C.) for 2 hrs. After interrupting the reaction, the polymer was discharged in the same manner as in Example 1 and applied with recovery process. The pH of the 10-fold diluted reaction slurry with water was 10.0. No substantial polymer was remained in the polymerization vessel (autoclave). The resultant PAS was an ultra-high-molecular-weight PAS of an excellent handling property with an average grain size of 1.1 mm, a bulk density of 0.35 (g/ml) and a melt viscosity of 41,000 poise (solution viscosity $\eta_{inh}$=0.74).

EXPERIMENT (3b) (COMPARATIVE EXPERIMENT)

In the two-phase separated polymerization step in Experiment (3a), after maintaining the reaction system at a temperature (T$_2$=249° C.) only for 15 min, and the polymerization was continued while elevating the temperature (T$_3$) of the reaction system to 260° C. About 2 hrs after the temperature of the reaction temperature (T$_3$) reached 260° C., stirring could no more be continued due to the overload.

Upon examining the inside of the autoclave in the same manner as in Experiment (1b), the situation was substantially similar to that in Experiment (1b). The melt viscosity of the polymer was 10500 poise (solution viscosity $\eta_{inh}$=0.49).

Figure 3:
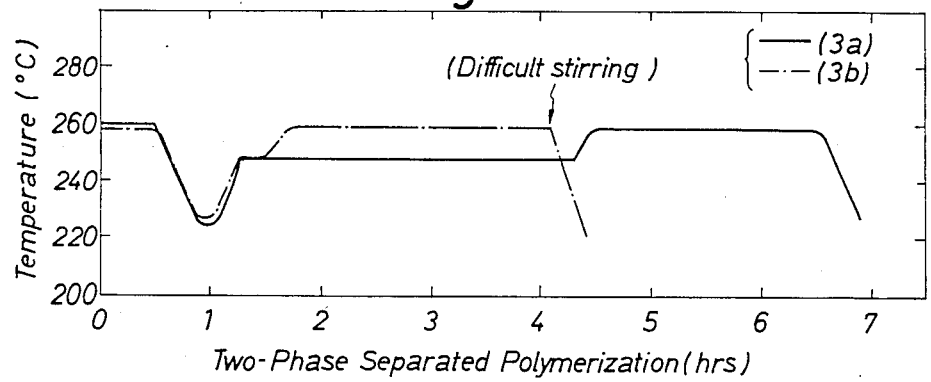

Temperature profiles in Experiments (3a) and (3b) of Example 3 are collectively shown in FIG. 3—3.

EXAMPLE 4

Into a 20 liter autoclave lined with Ti, 11.0 kg of NMP and 25.0 mcl of Na$_2$S (solid content: 45.98%) used in Example 1 were charged and, while heating to elevate the temperature to about 203° C. under an N$_2$ gas stream, 82.5 mol of water and 2.1 kg of NMP were distilled out.

24.9 mol of p-DCB and 3.1 kg of NMP were added [(arylene group/NMP)=2.5 (mol/kg), (total water content/NMP)=3.7 (mol/kg)].

A polymer slurry was obtained by conducting polymerization at 220° C. for 5 hrs. The melt viscosity $\eta^*$ of the polymer in the slurry was 125 poise. Water was added to the polymerization slurry [(total water content/NMP)=10.0 (mol/kg)] and polymerization was conducted at 260° C. for one hour to obtain a reaction slurry (S-1). The melt viscosity of the polymer in (S-1) was 320 poise.

About one-half of the slurry (S-1) was filtered to separate the liquid phase, and the solid content was recovered and washed with an aqueous NaOH solution of pH 13.1 to obtain a coarse granular prepolymer. The particles were pulverized by a mixer into fine particles of not more than about 2 mm, washed again with an aqueous NaOH solution of pH=13.1, then washed twice with NMP to remove deposited water thereby obtain purified prepolymer wet-cake in which the content of noxious materials reduced.

Solvent-containing wet-cake containing 108 g (1.0 basic mol) of the prepolymer was transferred into a one liter autoclave lined with Ti, to which were added NMP and 2 g of NaOH. Water was further added to adjust to (total water content/NMP)=10.0 (mol/kg) and (total arylene group/NMP)=2.0 (mol/kg). Then, the resultant mixture was heated under stirring and reacted at a temperature ($T_1$=260° C.) for 1.0 hr and at a temperature ($T_2$=248° C.) ($\Delta T$=12° C.) for 5 hrs. After cooling, the autoclave was opened to discharge the slurry (pH of a 10-fold diluted reaction slurry with water=11.3), the polymer was sieved by using a screen (openings: 0.1 mm), washed with acetone/water by three times and dried to obtain a polymer. The resultant polymer was an ultra-high-molecular-weight PAS of generally preferable handling property with an average grain size of 1.2 mm, a bulk density of 0.34 (g/ml) and a melt viscosity of 16400 poise ($\eta_{inh}$=0.66).

What is claimed is:

1. A process for producing a high-molecular-weight or ultra-high-molecular-weight polyarylene sulfide of an excellent handling property, which process comprises:
    (1) a preliminary polymerization step of subjecting an alkali metal sulfide and a dihalo aromatic compound to dehalogenation and sulfidation in a system where the amount of an aprotic organic polar solvent used is from 0.2 to 5 kg per one mole of the alkali metal sulfide charged and from 0.5 to 5 mol of water is present together per kg of the organic polar solvent, until the conversion of the dihalo aromatic compound charged reaches from 50 to 98 mol % and the melt viscosity of the resultant prepolymer reaches 5 to 300 poise (as measured at 310° C. under a shear rate of 200 sec$^{-1}$), and
    (2) a two-phase separated polymerization step of adding water to the resultant reaction mixture such that from 5.5 to 15 mol of water is present per kg of the organic polar solvent in the reaction system without separating the resultant prepolymer from the reaction system,
        (i) heating and maintaining the reaction system for at least 10 minutes at a temperature ($T_1$) within a range of from 257° to 290° C. while stirring,
        (ii) lowering the temperature of the reaction system and maintaining the reaction system for at least 2.0 hours at a temperature ($T_2$) within a range of from 220° to 250° C. while stirring.

2. A process according to claim 1, wherein the amount of the organic polar solvent used in the reaction system in the preliminary polymerization step is from 0.25 to 2 kg per one mol of the alkali metal sulfide charged.

3. A process according to claim 1, wherein the resultant polyarylene sulfide is a polymer comprising the repeating unit:

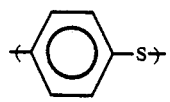

as the main ingredient.

4. A process according to claim 1, wherein the resultant polyarylene sulfide is a substantially linear polymer.

5. A process according to claim 1, wherein the difference between $T_1$ and $T_2$ is not less than 8° C.

6. A process for producing a high-molecular-weight or ultra-high-molecular-weight polyarylene sulfide of an excellent handling property, which process comprises:
    (1) a preliminary polymerization step of subjecting an alkali metal sulfide and a dihalo aromatic compound to dehalogenation and sulfidation in an aprotic organic polar solvent, thereby forming a prepolymer of a melt viscosity from 5 to 300 poise (as measured at 310° C. under a shear rate of 200 sec$^{-1}$), and
    (2) a two-phase separated polymerization step of separating the resultant prepolymer, dispersing the thus separated prepolymer in an aprotic organic polar solvent containing from 5.5 to 15 mol of water per kg of the organic polar solvent such that from 0.5 to 3.5 mol of arylene group therein is present per kg of the organic polar solvent,
        (i) heating the thus obtained dispersion in a strongly alkaline condition (pH of the 10-fold diluted dispersion with water is not less than 9.5) and maintaining the reaction system at a temperature ($T_1$) within a range of from 257° to 290° C. for at least 10 minutes while stirring,
        (ii) lowering the temperature of the reaction system and maintaining the reaction system at a temperature ($T_2$) within a range of from 220°–250° C. for at least 2.0 hours while stirring.

7. A process according to claim 6, wherein the amount of the arylene group present together per kg of the organic polar solvent in the reaction system in the two-phase separated polymerization step is from 2.3 to 3.5 mols.

8. A process according to claim 6, wherein the resultant polyarylene sulfide is a polymer comprising the repeating unit:

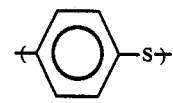

as the main ingredient.

9. A process according to claim 6, wherein the resultant polyarylene sulfide is a substantially linear polymer.

10. A process according to claim 6, wherein the difference between $T_1$ and $T_2$ is not less than 8° C.

11. A high-molecular-weight or ultra-high-molecular-weight polyarylene sulfide produced by the process according to claim 1 or 6, showing an excellent free flowing property and handling property, and having:
    an average grain size of from 0.25 to 3 mm,
    a bulk density of 0.25 to 0.8 g/ml,
    a sharp grain size distribution with the grain size from 0.25 to 5 mm, and
    a melt viscosity of not less than 1000 poise (as measured at 310° C. under a shear rate of 200 sec$^{-1}$).

12. A process according to claims 1 or 6, after step (ii) further comprising heating and maintaining the reaction system at a temperature ($T_3$) within the range of from 250° to 290° C. for a sufficient time to form a polyarylene sulfide of a desired melt viscosity while stirring.

* * * * *

UNITED STATES PATENT AND TRADEMARK OFFICE
CERTIFICATE OF CORRECTION

PATENT NO. : 4,794,164

DATED : Dec. 27, 1988

INVENTOR(S) : Takao IWASAKI, et al.

It is certified that error appears in the above-identified patent and that said Letters Patent is hereby corrected as shown below:

The following correction is made to the Title Page:

-- [*] Notice: The portion of the term of this patent subsequent to Feb. 24, 2004 has been disclaimed. --

Signed and Sealed this

Thirty-first Day of October, 1989

Attest:

DONALD J. QUIGG

Attesting Officer

Commissioner of Patents and Trademarks